(12) United States Patent
D'Errico et al.

(10) Patent No.: US 10,153,849 B2
(45) Date of Patent: Dec. 11, 2018

(54) FSO COMMUNICATIONS TERMINALS FOR CONNECTING TELECOMMUNICATIONS CARDS

(71) Applicant: Telefonaktiebolaget LM Ericsson (publ), Stockholm (SE)

(72) Inventors: Antonio D'Errico, Pisa (IT); Antonella Bogoni, Pisa (IT); Fabio Cavaliere, Pisa (IT); Luca Giorgi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 68 days.

(21) Appl. No.: 15/106,976

(22) PCT Filed: Dec. 24, 2013

(86) PCT No.: PCT/EP2013/077982
§ 371 (c)(1),
(2) Date: Jun. 21, 2016

(87) PCT Pub. No.: WO2015/096862
PCT Pub. Date: Jul. 2, 2015

(65) Prior Publication Data
US 2016/0373192 A1    Dec. 22, 2016

(51) Int. Cl.
*H04B 10/00* (2013.01)
*H04B 10/80* (2013.01)
*H04B 10/564* (2013.01)

(52) U.S. Cl.
CPC ......... *H04B 10/803* (2013.01); *H04B 10/564* (2013.01)

(58) Field of Classification Search
CPC ............................ H04B 10/564; H04B 10/803
(Continued)

(56) References Cited

U.S. PATENT DOCUMENTS

| 5,204,866 A | * | 4/1993 | Block | H04B 10/803 |
| | | | | 372/27 |
| 6,525,853 B1 | * | 2/2003 | Stuart | H04B 10/2581 |
| | | | | 385/18 |

(Continued)

OTHER PUBLICATIONS

Bisaillon et al; Free-Space optical link with spatial redundancy for misalignment tolerance; 2002 IEEE, pp. 242-244.*

(Continued)

*Primary Examiner* — Amritbir Sandhu
(74) *Attorney, Agent, or Firm* — Baker Botts, LLP (57) ABSTRACT

The invention provides a free space optical (FSO) communications terminal for a first telecommunications card or a backplane. The FSO terminal comprises a plurality of transmission interfaces. The FSO terminal further comprises a light signal generating unit adapted to generate a plurality of light signals. Each of the plurality of light signals carries the same information as the other one or more of the plurality of light signals and is arranged for transmission through a respective one of the plurality of transmission interfaces. Each of the plurality of light signals is at a different orthogonal mode from the other one or more of the plurality of light signals. The invention further provides a free space optical (FSO) communications terminal for a second telecommunications card or a backplane. The FSO terminal comprises a plurality of receive interfaces. Each of the plurality of receive interfaces adapted to receive a light signal carrying information. The light signal may be at any one of a plurality of orthogonal modes. The FSO terminal further comprises a plurality of optical-to-electrical signal convertors. The invention further provides an optical backplane, a router and an optical node.

9 Claims, 8 Drawing Sheets

(58) Field of Classification Search
USPC .................................................. 398/140–145
See application file for complete search history.

(56) References Cited

U.S. PATENT DOCUMENTS

| | | | | |
|---|---|---|---|---|
| 7,327,914 | B1* | 2/2008 | Kahn | G02B 6/4206 |
| | | | | 385/15 |
| 9,344,779 | B2* | 5/2016 | Sethumadhavan | H04J 14/04 |
| 2005/0169574 | A1* | 8/2005 | Park | H04B 10/2572 |
| | | | | 385/28 |
| 2006/0018260 | A1* | 1/2006 | Richmond | H04J 3/14 |
| | | | | 370/236.2 |
| 2011/0091207 | A1* | 4/2011 | Xie | H04B 10/564 |
| | | | | 398/38 |
| 2011/0243574 | A1* | 10/2011 | Essiambre | G02B 6/29311 |
| | | | | 398/200 |
| 2012/0177065 | A1* | 7/2012 | Winzer | H04B 10/2581 |
| | | | | 370/480 |
| 2012/0251126 | A1* | 10/2012 | Winzer | G02B 6/03611 |
| | | | | 398/141 |
| 2013/0034196 | A1* | 2/2013 | Vann | H04B 7/002 |
| | | | | 375/350 |
| 2013/0209106 | A1* | 8/2013 | Mukasa | H04J 14/02 |
| | | | | 398/79 |
| 2014/0079400 | A1* | 3/2014 | Sengupta | H04J 14/02 |
| | | | | 398/79 |
| 2014/0186033 | A1* | 7/2014 | Winzer | H04B 10/2581 |
| | | | | 398/39 |
| 2014/0299743 | A1* | 10/2014 | Miller | G02B 27/145 |
| | | | | 250/204 |
| 2016/0212510 | A1* | 7/2016 | Bogoni | H04J 14/04 |
| 2016/0373192 | A1* | 12/2016 | D'Errico | H04B 10/803 |
| 2017/0033885 | A1* | 2/2017 | Cavaliere | H04B 10/25759 |

OTHER PUBLICATIONS

Bisaillon et al; Free space Optical link with spatial redundancy for Misalignment tolerance; Feb. 2002; IEEE; pp. 242-244.*
Neilson et al; Tolerance of optical interconnections to misalignment; Apr. 1999; Applied optics; pp. 2282-2290.*
Efficient Multiplexing and Demultiplexing of Free-Space Orbital Angular Momentum Using Photonic Integrated Circuits by Fontaine et al.; Optical Society of America—2012.
Free-Space Information Transfer Using Light Beams Carrying Orbital Angular Momentum by Gibson et al.; Optical Society of America—2004.
Free-Space Optical MIMO Transmission With Q-ARY PPM by Wilson et al.; IEEE Transactions on Communications, vol. 53, No. 8—Aug. 2005.
Free-Space Optical Link With Spatial Redundancy for Misalignment Tolerance by Bisaillon et al.; IEEE Photonics Technology Letters, vol. 14, No. 2—Feb. 2002.
Free-Space Optical Communication Using Orthogonal Optical Angular Momentum Modes by Anguita et al.; Submitted to TWC—2012.
Integrated Compact Optical Vortex Beam Emitters by Cai et al.; www.sciencemag.org; Science, vol. 338—Oct. 19, 2012.
Integrated Optical Orbital Angular Momentum Multiplexing Device Using 3-D Waveguides and a Silica PLC by Guan et al.—2013.
Orbital Angular Momentum Modulation for Fiber-Optics Communication by Ivan B. Djordjevic; 17th Opto-Electronics and Communications Conference (OECC 2012) Technical Digest; Jul. 2012; Busan, Korea—2012.
International Search Report for International application No. PCT/EP2013/077982—dated Nov. 5, 2014.
Tolerance of Optical Interconnections to Misalignment by David T. Neilson (XP-000830103); Applied Optics / vol. 38, No. 11 / Apr. 10, 1999.
Using Tapers for Efficient Coupling of Received FSO-Signals Into Fibres by Leitgeb et al.; ICTON; Tu.D5.3—2011.

* cited by examiner

Not to Scale

FSO COMMUNICATIONS TERMINALS FOR CONNECTING TELECOMMUNICATIONS CARDS

PRIORITY

This nonprovisional application is a U.S. National Stage Filing under 35 U.S.C. § 371 of International Patent Application Serial No. PCT/EP2013/077982, filed Dec. 24, 2013, and entitled "FSO Communications Terminals For Connecting Telecommunications Cards."

TECHNICAL FIELD

The present invention relates to free space optical (FSO) communications terminals for telecommunications cards. The present invention further relates to telecommunications cards comprising FSO optical communications terminals, an optical backplane, a router and an optical node.

BACKGROUND

Currently, connections between telecommunications cards in routers are realised via a backplane based on electrical circuitry. The backplane comprises electrical lines and, at the interfaces between the backplane and each of the cards the backplane comprises an electrical pin. The cards are plugged onto the electrical pins. Usually the cards can be plugged onto the pins without the need for a mechanical adjustment mechanism, although an exception exists for particularly dense cards, where a mechanical adjustment mechanism might be required to increase the insertion accuracy, so as to avoid damaging the pins.

However, as data throughput continues to increase, these electrical connections will need to be updated to support higher capacity. The next throughput capacity will require line cards to process data flows at 400 Gbps and beyond. Thus, the electrical lines will be required to support increased electrical bandwidth, for example up to 25 GHz over tens of centimeters.

At these distances and capacities using optical rather than electrical lines to realise the connections is a viable alternative, due to the ability of optical connections to support high throughput, with a more sustainable footprint, lower power consumption, interference and density.

In the article "An optical Backplane Connection System with Pluggable Active Board Interfaces", Richard Pitwon, Ken Hopkins and Dave Milward, Xyratex White Paper 2007 a system is proposed for providing optical connections between line cards in a router.

However, a problem with this system is that the tolerance to lateral misalignment of the optical interfaces is only in the region of 50 micrometers. In comparison, the tolerance to lateral misalignment for electrical pins is approximately 1 millimeter. Thus, mechanical mechanisms are required to align the transmitting and receiving optical interfaces, in order to achieve good system performance and avoid wasting optical power. However, these mechanisms are costly, as they need to compensate for vibrations, temperature changes and ageing, and there are also operational costs involved to train personnel at the sites to operate the mechanisms. Further, active self-aligning mechanisms for the optical interfaces are also unpractical, for cost, reliability, life time and power consumption reasons.

The present invention aims to address these problems.

SUMMARY

According to the present invention there is provided a free space optical (FSO) communications terminal for a first telecommunications card or a backplane. The FSO terminal comprises a plurality of transmission interfaces. The FSO terminal further comprises a light signal generating unit adapted to generate a plurality of light signals. Each of the plurality of light signals carries the same information as the other one or more of the plurality of light signals and is arranged for transmission through a respective one of the plurality of transmission interfaces. Each of the plurality of light signals is at a different orthogonal mode from the other one or more of the plurality of light signals.

There is also provided a free space optical (FSO) communications terminal for a second telecommunications card or a backplane. The FSO terminal comprises a plurality of receive interfaces. Each of the plurality of receive interfaces is adapted to receive a light signal carrying information. The light signal may be at any one of a plurality of orthogonal modes. The FSO terminal further comprises a plurality of optical-to-electrical signal convertors.

Embodiments of the present invention have the advantage that optical connections between telecommunications cards can be realised, with improved tolerance to misalignment of the transmitting and receiving terminals, in a cost efficient manner.

In a first embodiment of the present invention each of the plurality of optical-to-electrical signal convertors is optically coupled to a respective one of the plurality of receive interfaces. Advantageously, this may provide a simple configuration.

However, in a second, preferred embodiment of the present invention, the FSO receiver terminal may further comprise an orthogonal mode selector. The orthogonal mode selector is optically coupled to each of the receive interfaces and is adapted to pass received light signals at respective orthogonal modes to respective ones of the plurality of optical-to-electrical signal convertors. This embodiment has the advantage that the received light signals can be identified (and also any non-received light signals can be identified). Advantageously, this enables the transmitting terminal to improve its power efficiency. For example, the transmitting terminal may increase the power of a received light signal, so as to improve the connection, and or turn off, or reduce the power of, a non-received light signal (or a light signal only received at very low power).

The light signal generating unit may be adapted to selectively turn off or adjust the power of each of the plurality of light signals. In particular, the light signal generating unit may be adapted to receive an indication identifying one or more orthogonal modes (i.e. one or more of the plurality of light signals) and to selectively turn off or adjust the power of at least one of the plurality of light signals based on the indication.

In an embodiment of the present invention, the FSO receiver terminal may comprise a selector adapted to selectively pass an electrical signal output by a selected one of the plurality of optical-to-electrical signal convertors to an information recovery unit.

In a preferred embodiment of the present invention, the FSO receiver terminal may further comprise a plurality of optical power detectors. Each of the optical power detectors is adapted to detect the power of a light signal received by a respective one of the plurality of optical-to-electrical signal convertors. The selected one of the plurality of optical-to-electrical signal convertors may be selected based on the power of the light signal received by that optical-to-electrical signal convertor. Thus, advantageously, this enables a high performance link (for example the link with the highest optical power) to be selected.

The FSO receiver terminal may further comprise a processing unit adapted to form an indication identifying one or more of the plurality of orthogonal modes. The indication may be formed dependent on, for each of the one or more orthogonal modes, whether a light signal is received by the optical-to-electrical signal convertor associated with that orthogonal mode, and optionally, if so, the power of the light signal.

In a preferred embodiment of the present invention, each of the receive interfaces is circular and the receive interfaces are arranged according to circle packing. As known in the art, "circle packing" requires that the circles are arranged such that the circles are touching but not overlapping. Advantageously, this enables the spaces between the receive interfaces, where a light signal cannot be received, to be minimised, and therefore the likelihood that a light signal transmitted to the receiving terminal is received by a receive interface can be increased.

According to the present invention, there is also provided a telecommunications card comprising one or more FSO transmitter terminals as described above and or one or more FSO receiver terminals as described above.

Advantageously, the FSO terminals may be arranged such that information can be transmitted directly between the telecommunications cards via the FSO terminals. However, in alternative embodiments, the FSO terminals may be arranged such that the information can be transmitted between the telecommunications cards via an optical backplane.

According to the present invention, there is provided a backplane comprising a first free space optical (FSO) communications terminal comprising a plurality of receive interfaces. Each of the plurality of receiver interfaces is adapted to receive a light signal carrying information. The light signal may be at any one of a plurality of orthogonal modes. The backplane also comprises a second free space optical (FSO) communications terminal comprising a plurality of transmission interfaces. The backplane further comprises an optical fibre arrangement adapted such that each light signal received by the first FSO terminal is conveyed to the second FSO terminal such that received light signals at respective orthogonal modes are transmitted through respective ones of the plurality of transmission interfaces.

This embodiment has the advantage that the backplane may comprise only passive optical components (i.e. optical components which require no power source), which may be cheaper and more reliable than active optical components.

In a preferred embodiment of the present invention, the optical fibre arrangement comprises an orthogonal mode multiplexer adapted to multiplex each of the light signals received by the first FSO terminal into a combined light signal. The optical fibre arrangement further comprises an orthogonal mode de-multiplexer adapted to de-multiplex the combined light signal into a plurality of light signals, each at a respective orthogonal mode, for transmission through a respective one of the plurality of transmission interfaces. Thus, advantageously, the received light signals may be conveyed to the transmitting terminal through a single optical fibre which, given the distance between the first and second FSO terminals may be several meters, may lead to a significant cost saving.

There is also provided a backplane comprising a first FSO receiver terminal as described previously and a second FSO transmitter terminal as described previously, wherein the light signal generating unit is adapted to generate the plurality of light signals using an electrical signal output by one of the electrical-to-optical signal convertors.

This embodiment may require that the backplane comprises active components (i.e. components which require a power source). However, this embodiment has the advantage that the tolerance to misalignment between the first and second FSO terminals and their opposite terminals on the telecommunications cards can be increased, since even if only one light signal is received by the first FSO terminal, a plurality of light signals may be transmitted from the second FSO terminal.

There is also provided a router or an optical node comprising one or more first telecommunications cards comprising an FSO transmitter terminal as described above, and one or more second telecommunications cards comprising a receiver FSO terminal as described above. Optionally, the router or optical node may further comprise a backplane as described above.

DESCRIPTION OF THE DRAWINGS

Embodiments of the present invention will now be described, by way of example only, with reference to the accompanying drawings in which.

DESCRIPTION

Figure 1:
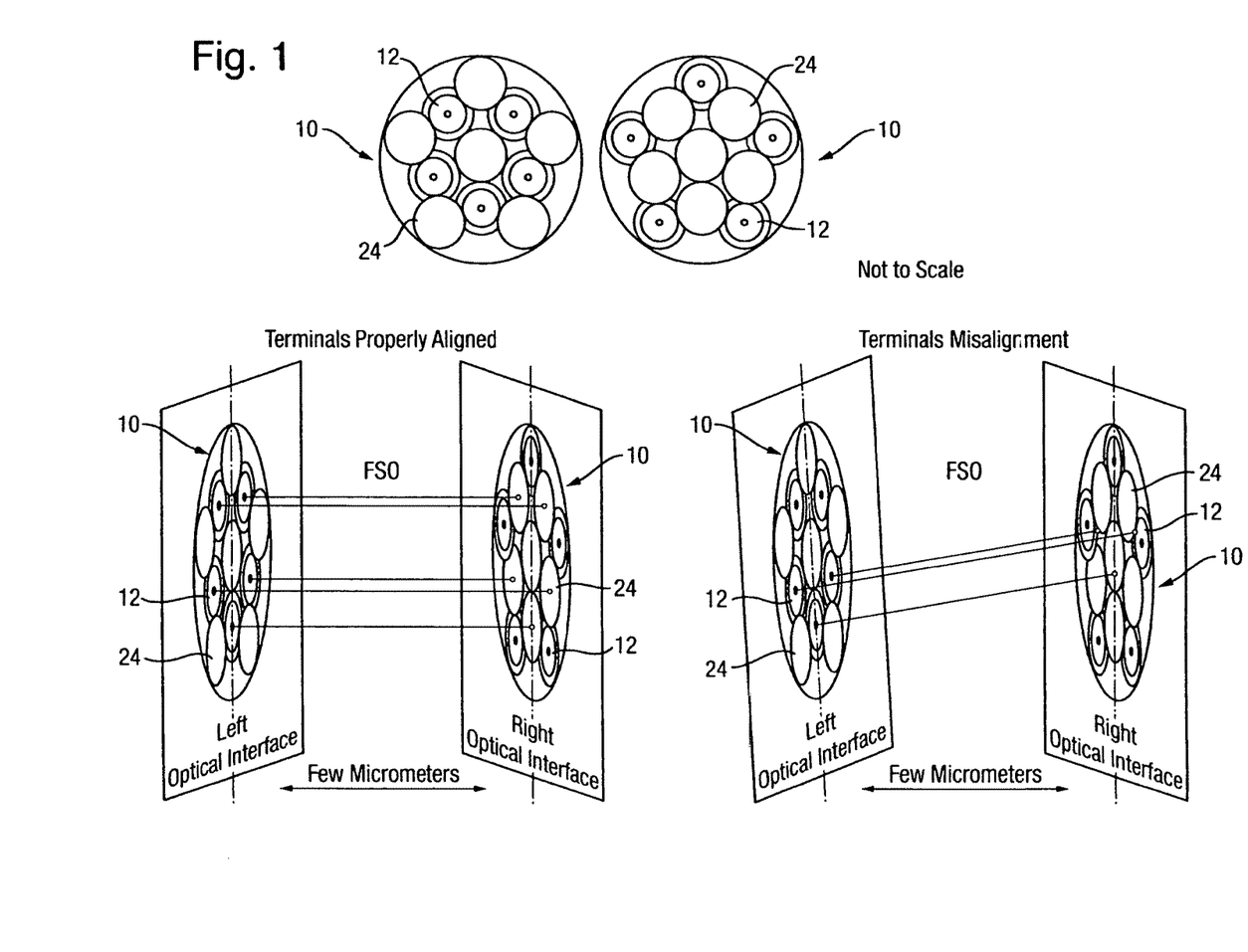
FIG. 1 shows a pair of corresponding FSO communications terminals according to a first embodiment the present invention.

FIG. 1 illustrates an example of first and second Free Space Optical (FSO) communication terminals 10 suitable for transmitting information (traffic) between telecommunication cards according to an embodiment of the present invention.

The term "telecommunication card" is intended to refer to cards (printed circuit boards comprising electronic components) for use in telecommunications networks. The telecommunication cards may, for example but not exclusively, be line cards in a router or transponders in an optical node.

In this example, each of the FSO terminals 10 is adapted to receive and transmit information, thus enabling two-way communication between the telecommunications cards (not shown). However, in an alternative embodiment, only one of the FSO terminals 10 may be adapted to receive information, and the other FSO terminal 10 may be adapted to transmit information.

Figure 2:
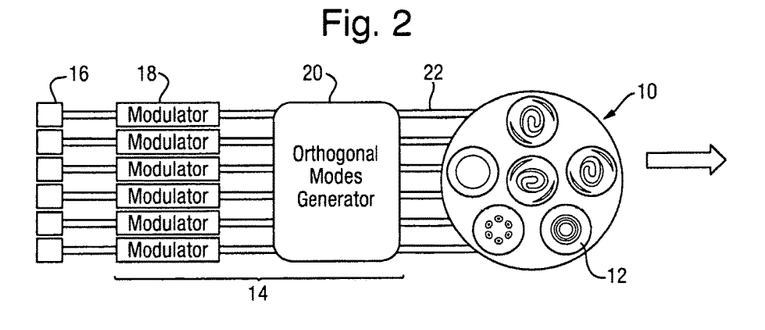
FIG. 2 shows an example of an FSO transmitter terminal according to an embodiment of the present invention.

FIG. 2 illustrates an example of a FSO (transmitter) terminal 10. The FSO terminal 10 comprises a plurality of transmission interfaces 12. Note that these transmission interfaces 12 are not drawn to scale. Each of the transmission interfaces 12 is circular. The transmission interfaces 12 are spaced apart from the other. In this example, each of the transmission interfaces 12 comprises the end of a respective single mode optical fibre 22. Thus, each of the transmission interfaces 12 is around 10 micrometers in diameter.

The FSO transmitter terminal 10 further comprises a light signal generating unit 14, which is adapted to generate a plurality of light signals. Each of the light signals carries the same information as the other one or more of the plurality of light signals, but is at a different orthogonal mode from each of the other one or more of the light signals.

In this example, the light signal generating unit 14 comprises a plurality of lasers 16, each coupled to a respective modulator 18, in this example by a respective optical fibre 22. The modulators 18 modulate the light signals to carry the information (traffic) to be transmitted. As will be understood by those skilled in the art, any modulation format may be used, for example OOK (on off keying) or DQPSK (differential phase-shift keying). The traffic may have a bit rate, of for example up to 100 Gbps. The modulated light signals are then passed, in this example again by respective optical fibres 22, to an orthogonal mode generator 20, which converts each of the light signals to a respective (i.e. different) orthogonal mode.

Advantageously, this example may provide a cost effective implementation. The lasers 16 may be common commercial lasers, and the orthogonal modes generator 20 may simply comprise a plurality of passive masks which each convert a light signal passed there through to a respective orthogonal mode. However, other implementations are possible, as will be appreciated by those skilled in the art.

Each of the light signals is then passed to a respective one of the transmission interfaces 12, in this example by a respective optical fibre 22. The light signals are then transmitted through the transmission interfaces 12.

Figure 3:
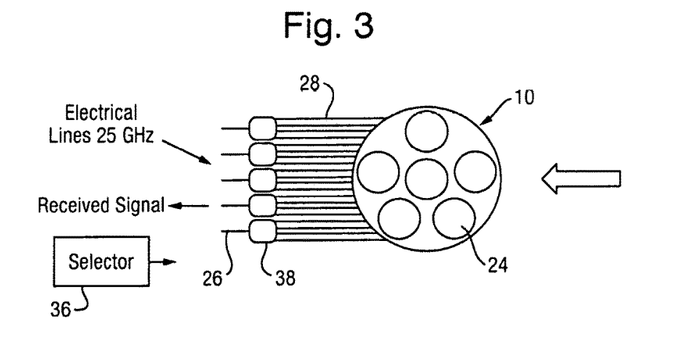
FIG. 3 shows an example of an FSO receiver terminal according to a first embodiment of the present invention.

An example of an FSO receiver terminal 10 according to a first embodiment of the present invention will now be described with reference to FIG. 3.

The FSO receiver terminal 10 comprises a plurality of receive interfaces 24, which are each adapted to receive a light signal carrying information. The light signal may be at any one of a plurality of orthogonal modes.

Figure 5:
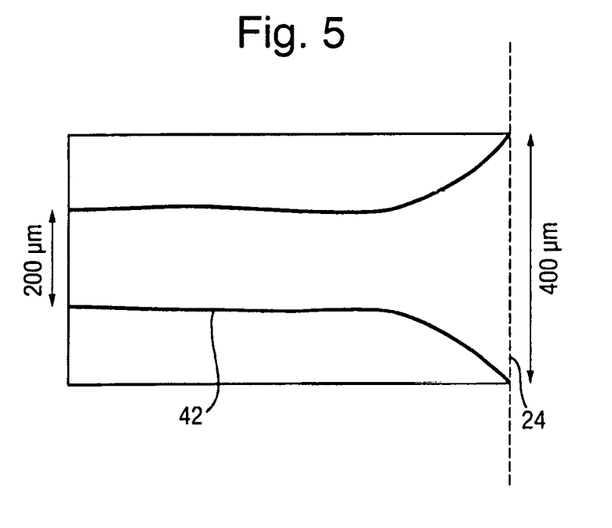
FIG. 5 shows an example of a receive Interface.

Again note that the receive interfaces 24 are not drawn to scale. Each of the receive interfaces is circular. In this example, each of the receive interfaces 24 comprises an end of a respective multi-mode optical fibre 28. This has the advantage that the receive interfaces 24 may be around 100 micrometers (much larger than the transmission interfaces 12). Further, as illustrated in FIG. 5, in a preferred embodiment of the present invention, each of the multi-mode optical fibres 28 may comprise a core 42 which has a tapered portion towards the receive interface 24 such that the diameter of the receive interface 24 may be larger than the diameter of the core 42 of the optical fibre 28. In this way, advantageously, the diameter of the receive interface 24 may be increased for example to around 400 micrometers.

The FSO receiver terminal 10 further comprises a plurality of optical-to-electrical signal convertors 26, which are optically coupled to the receive interfaces 24. In this example, the optical-to-electrical signal convertors 26 are photodiodes PINs which are, advantageously, cheap components. However, the optical-to-electrical signal convertors 26 may comprise any type of device capable of converting an optical or light signal to an electrical signal.

In this first embodiment of the present invention, each of the plurality of optical-to-electrical signal convertors 26 is optically coupled to a respective one of the receive interfaces 24, in this example by a respective optical fibre 28.

Figure 4:
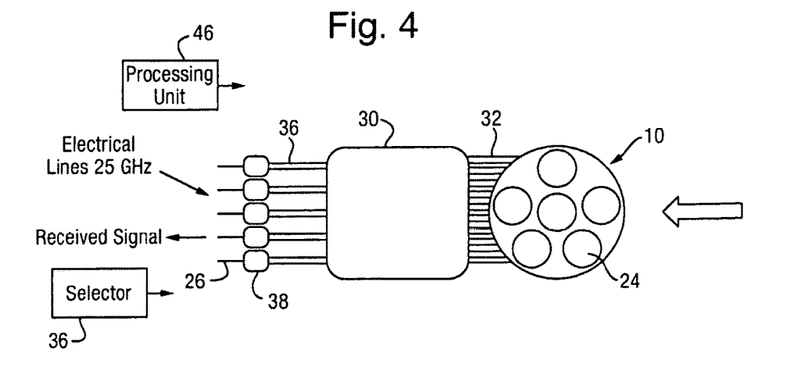
FIG. 4 shows an example of an FSO receiver terminal according to a second embodiment of the present invention.

FIG. 4 illustrates an alternative example of an FSO receiver terminal 10 according to a second embodiment of the present invention. The configuration of the FSO terminal 10 is the same as that of the FSO receiver terminal 10 described with respect to FIG. 3, except that the FSO terminal 10 further comprises an orthogonal mode selector 30. The orthogonal mode selector 30 is optically coupled to each of the receive interfaces 24, in this example by respective optical fibres, and is adapted to pass received light signals at respective orthogonal modes to respective ones of the plurality of optical-to-electrical signal convertors 26.

In this example, the orthogonal mode selector 30 comprises an orthogonal mode multiplexer (not shown) which combines the received light signals into a single combined light signal. The orthogonal mode selector also comprises an orthogonal mode splitter 30 (not shown) which then splits the combined light signal into a plurality of light signals, each at a respective orthogonal mode, and passes the light signals, along respective optical paths 34 (e.g. optical fibres), to respective ones of the plurality of optical-to-electrical signal convertors 26.

The orthogonal mode selector 30 may advantageously be a passive device (requiring no power source) and/or a static device (whereby signals at a particular orthogonal mode are always passed to a particular optical-to-electrical signal convertor 26).

As indicated in FIG. 1, the FSO terminals 10 are intended for operation over very short range. For example, the FSO transmitter and receiver terminals 10 may only be a few micrometers apart. As will be understood by those skilled in the art, Free Space Optical (FSO) communication is a known type of communication, which involves transmitting light signals carrying information through free space (i.e. "wirelessly").

As shown in FIG. 1, in this example, when the FSO terminals 10 are aligned, each of the plurality of light signals transmitted by one of the FSO terminals 10 is received by a respective one of the receive interfaces 24 on the opposite FSO terminal 10. However, even if the FSO terminals 10 are misaligned, provided at least one of the plurality of light signals is received by one of the receive interfaces on the opposite FSO terminal 10, a connection can be established or maintained between the FSO terminals 10.

Thus, advantageously, a tolerance to misalignment of the FSO transmitter and receiver terminals 10 is provided. Furthermore, because each of the light signals is at a different orthogonal mode from the others, advantageously, the light signals will not interfere with each other during propagation through the air. Thus, there is no need to perform complex, costly digital signal processing on the output electrical signals at the FSO receiver terminal, in order to separate out and equalise contributions from different light signals, as in known MIMO (multiple-in multiple-out) systems.

Even in the first embodiment of the FSO receiver terminal 10 described above with respect to FIG. 3, each optical-to-electrical signal convertor 26 will typically receive only one of the light signals. It is possible that a receive interface 24, and therefore an optical-to electrical signal convertor 26, may receive more than one light signal, when the terminals are misaligned. However, as these light signals will have propagated along adjacent paths, and therefore will have experienced similar conditions, these signals will arrive at the receive interface 24 effectively equalised (i.e. with negligible differences). Thus, these light signals effectively correspond to a single light signal with increased power, and may therefore be treated as such.

The FSO receiver 10 may further comprise a selector 36, which is adapted to selectively pass an electrical signal output by a selected one of the plurality of optical-to-electrical signal convertors to an information recovery unit (not shown), which retrieves the transmitted information. The selector 36 may comprise electronic circuitry and or a processor unit comprising any combination of hardware and or software. In FIGS. 3 and 4, this selected signal is indicated by an arrow and the words RECEIVED signal. Note that the signal is passed directly to the information recovery unit.

In a preferred embodiment of the present invention, the FSO receiver 10 may further comprise a plurality of optical power detectors 38. Each of the optical power detectors 38 is adapted to detect the power of a light signal received by a respective one of the plurality of optical-to-electrical signal convertors 26. In this example, advantageously, each optical-to-electrical signal convertor 26 and its optical power detector 38 are comprised in a single device (a photodiode). However, these components may be separate devices.

The selector 36 may further be adapted to select the selected one of the plurality of optical-to-electrical signal convertors 26 (i.e. the electrical signal which will be processed to retrieve the transmitted information) based on the power detected by one or more of the optical-to-electrical signal convertors 26. Thus, for example, the optical-to-electrical signal convertor 26 receiving the light signal with the highest power may be selected.

Referring again to the second embodiment of the FSO receiver terminal 10 described above, with reference to FIG. 4, in a preferred embodiment of the present invention, the FSO receiver terminal 10 may further comprise a processing unit 40, which is adapted to form an indication of one or more of the plurality of light signals transmitted by the FSO transmitter terminal 10. For example, the indication may indicate or identify the orthogonal mode of the light signal received by the selected optical-to-electrical signal convertor 26. In addition or alternatively, the indication may indicate or identify the orthogonal mode of any light signals which are not received by the FSO receiver terminal 10 (or which are received by the FSO receiver terminal 10 but only at a low power). This indication may be transmitted to the FSO transmitter terminal 10.

The processing unit 40 may comprise any appropriate combination of software and or hardware, and may for example comprise one or more processors integrated to any degree.

Referring again to FIG. 2, which illustrates the FSO transmitter terminal 10, in this preferred embodiment of the present invention, the light signal generating unit 14 may further be adapted to selectively turn off or adjust the power of each of the plurality of light signals. For example this may be based on the indication of one or more of the orthogonal modes (i.e. of the light signals), received from the FSO receiver terminal 10. Thus, advantageously, for example the power of the light signal received by the selected optical-to-electrical signal convertor 26 may be increased. In addition or alternatively the power of any non-received light signals (or light signals which are only received at a low power) may be reduced, or even turned off.

Figure 7:
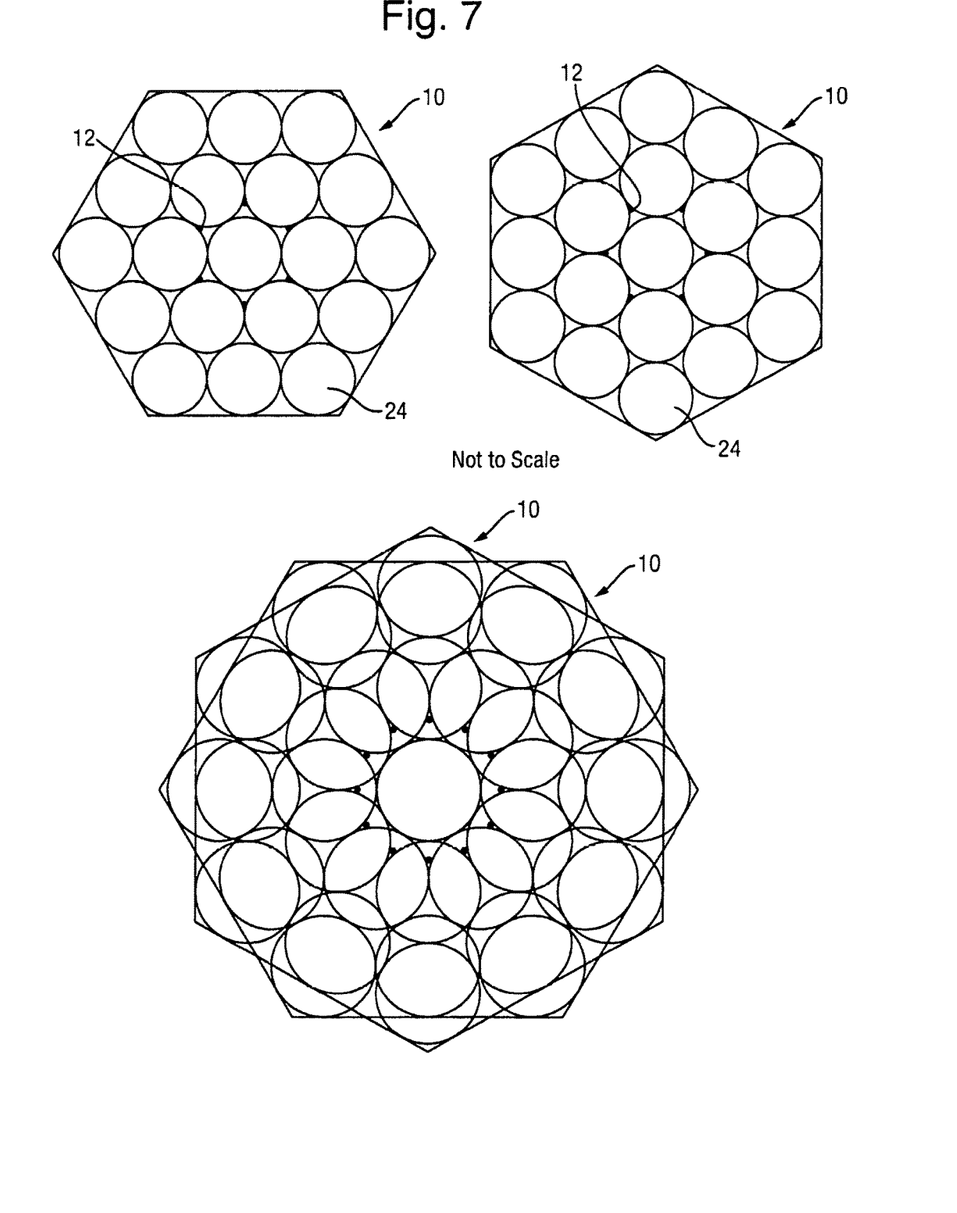
FIG. 7 shows a further example of a pair of corresponding FSO communications terminal according to an embodiment of the present invention.

FIG. 7 illustrates an arrangement of receive and transmission interfaces 12, 24 on a pair of FSO terminals 10 according to a preferred embodiment of the present invention. Similarly to the example shown in FIG. 1, in this example both of the FSO terminals 10 are transmitter and receiver terminals and therefore comprise both receive and transmission interfaces 12, 24. However, in other embodiments, one of the FSO terminals 10 may comprise only transmission interfaces 12, and the other FSO terminal 10 may comprise only receive interfaces 24.

In FIG. 7 it can be seen that as explained above the receive interfaces 24 are much larger than the transmission interfaces 12. Note also that, in this example, there is more receive interfaces 24 than transmission interfaces 12. Each of the FSO terminals 10 comprises nineteen receive interfaces 24 and six transmission interfaces 12. Each of the receive interfaces 24 is circular and the receive interfaces 24 are arranged according to "circle packing". As explained above, this means that the receive interfaces 24 are arranged such that they are touching but not overlapping. The transmission interfaces 12 are located in the gaps between the receive interfaces 24, in this example arranged around the centre of the FSO terminal 10 interface. In this example, the FSO terminal interface is hexagonal shaped and has a diameter of 3 square millimeters As indicated in FIG. 7, when the FSO terminals 10 are aligned, each of the plurality of light signals is received by a respective one of the receive interfaces on the opposite FSO terminal 10. Note that, however, because each FSO terminal 10 comprises more receive interfaces 24 than transmission interfaces 12, not every receive interface 24 will receive a light signal.

Figure 8:
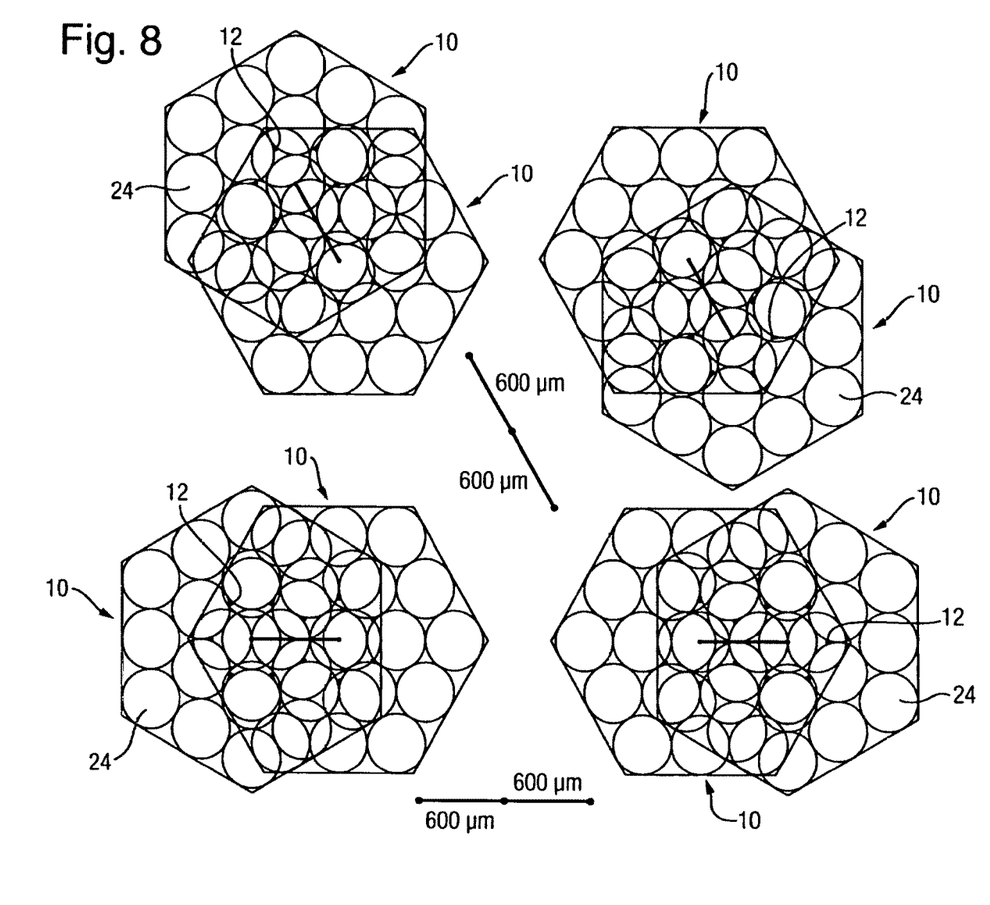
FIG. 8 shows examples the pair of FSO communications terminals shown in FIG. 7 when they are misaligned with each other.

FIG. 8 illustrates several examples where the FSO terminals 10 are misaligned. In these examples it is seen that the FSO terminals 10 may be misaligned in any lateral direction by 0.6 square millimeters (and all of the transmitted light signals will still be projected within the terminal interface of the opposite FSO terminal 10). Thus, the total lateral misalignment tolerated is 1.2 square millimeters. However, note that even greater misalignment may be tolerated, since as explained above it is only necessary for one of the transmitted light signals to be received by the opposite FSO terminal 10 for a connection to be established or maintained between the FSO terminals 10.

It is possible that one or more of the transmitted light signals may fall within the spaces between the receive interfaces 24 on the opposite FSO terminal 10 (which will be referred to as "white space"). However, in this example, when all of the light signals are projected within the area of the opposite terminal interface, the probability that one of the light signals is projected into white space is only 14 percent (proportional to the ratio between the size of the terminal interface and the total area of white space). The probability that two of the light signals are projected within white space is 50 percent smaller than the probability that only one of the light signals is projected within white space (thus, in this example, only 7 percent).

Figure 9:
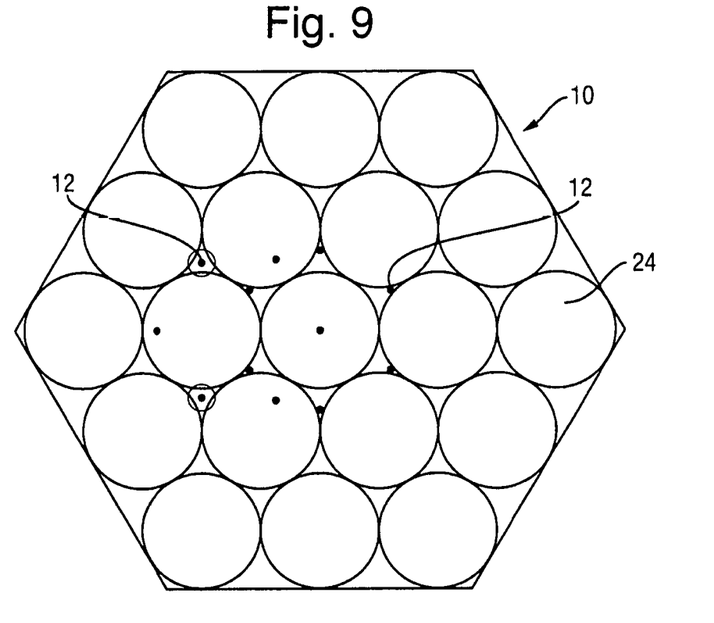
FIG. 9 illustrates an example where two of the transmitted light signals fall between the receive terminals on the opposite FSO communications terminal.

Further, as indicated in FIG. 9, in this example, advantageously, the transmission interfaces 24 are arranged such that it is not possible, when all the light signals are projected within the area of the opposite terminal interface, for more than two of the light signals to be projected into white space.

Figure 6:
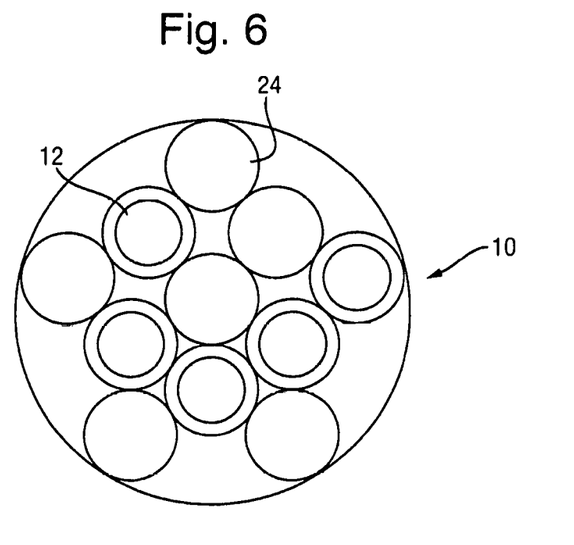
FIG. 6 shows an FSO communications terminal according to a second embodiment of the present invention.

In the examples illustrated in FIGS. 1, 7, 8 and 9, the receive interfaces 24 and the transmission 12 interfaces are arranged in a symmetrical configuration. However, in an alternative embodiment, as illustrated in FIG. 6, the receive interfaces 24 and the transmission 12 interfaces may be arranged in an asymmetrical configuration. An asymmetrical configuration may be advantageous, as it may allow optimisation of transverse coupling of the FSO terminals 10, and allow a reduction in fabrication tolerances.

The FSO terminals 10 may be provided on respective telecommunications cards (not shown). Note that the FSO terminals 10 may be manufactured separately from the telecommunications cards, and then attached to the telecommunications cards. Alternatively, the FSO terminals 10 may be integrated or embedded into the telecommunications cards, for example into the PCB layer, during manufacture of the cards.

In some embodiments of the present invention, the telecommunications cards may be arranged such that the information (traffic) is transmitted directly between them, as described above. However, in alternative embodiments, as illustrated in FIG. 10, the telecommunications cards may be arranged such that the information is transmitted between them via an optical backplane.

Figure 10:
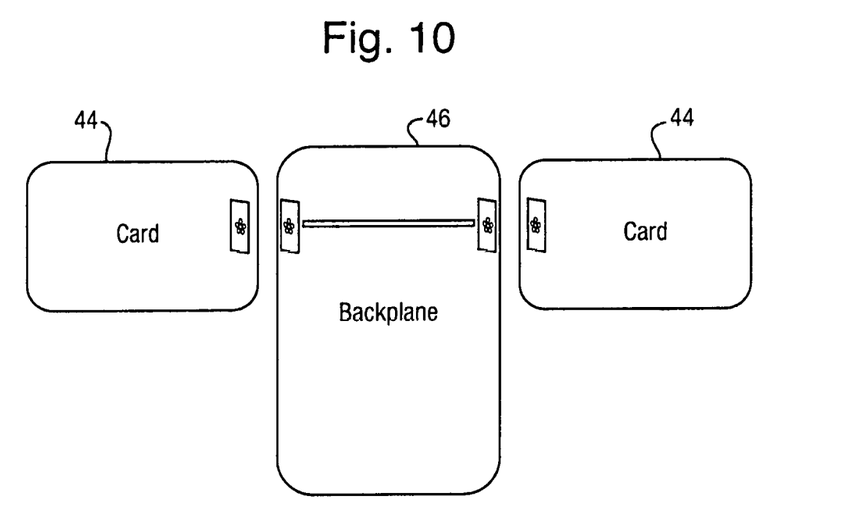
FIG. 10 illustrates two telecommunications cards connected via a backplane.

FIG. 10 illustrates an example of two telecommunication cards 44 connected via a backplane 46. The first telecommunications card 44 comprises an FSO transmitter terminal 10 as described above, and the second telecommunications card 44 comprises an FSO receiver terminal 10 as described above. The backplane 46 comprises a FSO receiver terminal 10 arranged opposite the FSO transmitter terminal 10 of the first telecommunications card 44, and a FSO transmitter terminal 10 arranged opposite the FSO receiver terminal 10 of the second telecommunications card 44.

Figure 11:
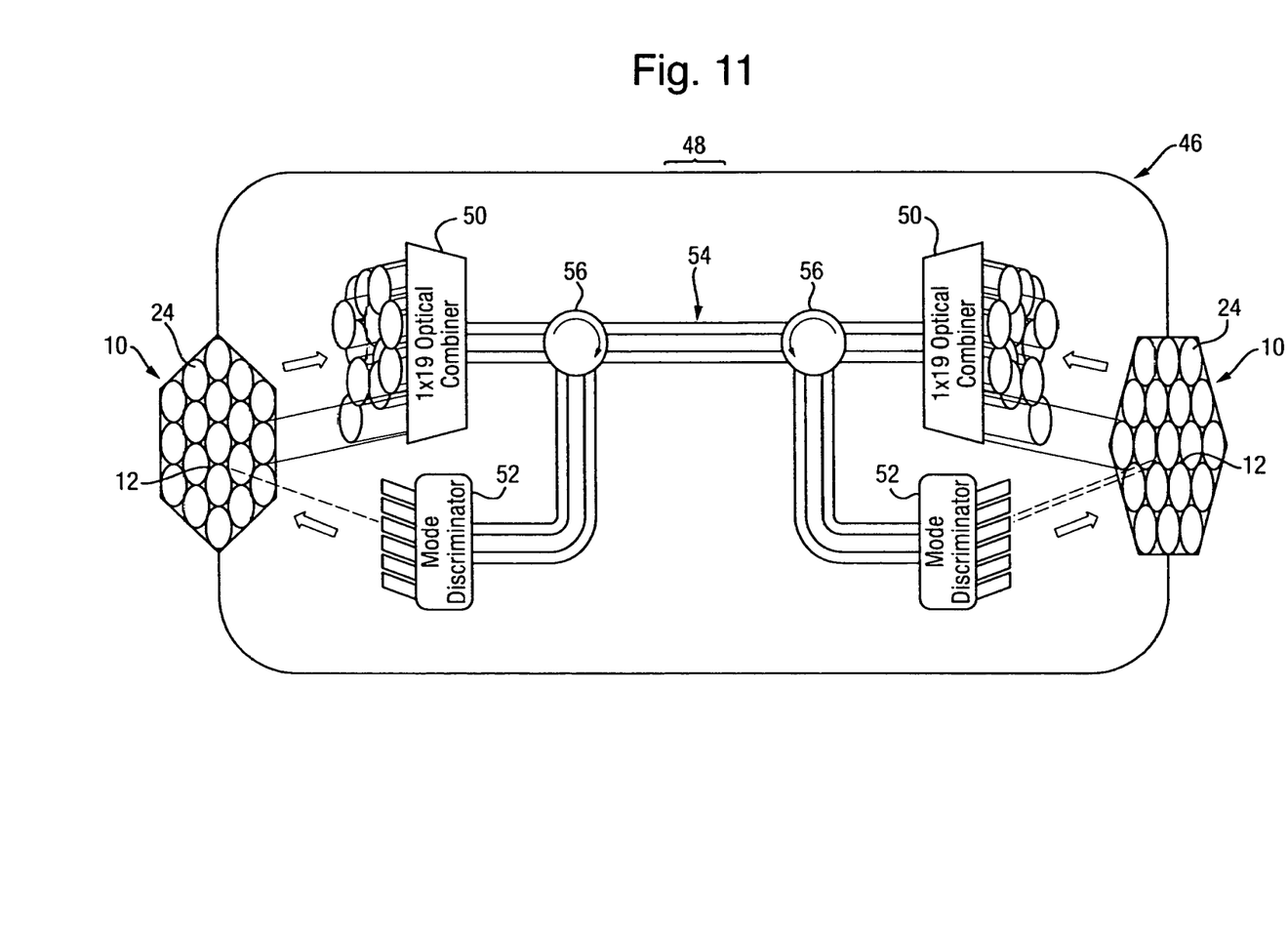
FIG. 11 illustrates an example of a passive optical backplane according to an embodiment of the present invention.

FIG. 11 illustrates an example of an optical backplane 46 according to a first embodiment of the present invention. In this example, the FSO receiver terminal 10 comprises a plurality of receive interfaces 24, each adapted to receive a light signal carrying information. The light signal may be at any one of a plurality of transmission interfaces 12. The FSO transmitter terminal 10 comprises a plurality of transmission interfaces. The first and second FSO terminals 10 are optically coupled together, by an optical fibre arrangement 48, such that light signals received by the FSO receiver terminal 10 at respective orthogonal modes are transmitted through respective ones of the plurality of transmission interfaces 12.

In this example, the optical fibre arrangement 48 comprises an optical mode multiplexer or combiner 50 optically coupled to each of the receive interfaces 12, by a respective optical path (e.g. an optical fibre). The FSO terminal 10 further comprises an optical mode de-multiplexer or splitter 52 optically coupled to each of the transmission interfaces 24 by a respective optical path (e.g. an optical fibre). The optical mode multiplexer 50 multiplexes the received optical signals, which will be at respective orthogonal modes, into a single, combined signal. This signal is then passed to the optical mode de-multiplexer 52 by a single optical fibre 54. This optical fibre 54 is a multimode optical fibre, and may be several meters long. The optical mode de-multiplexer 52 then splits the signal back into a plurality of optical signals, each at a respective orthogonal mode, and passes each of these signals to a respective one of the transmission interfaces 24, for transmission there through.

In this example, each of the FSO terminals 10 comprise both receive and transmission interfaces 12, 24 and accordingly the backplane 46 comprises two orthogonal mode combiners 50 and two orthogonal mode splitters 52. In this example, the light signals combined by the respective orthogonal mode combiners 50 are passed along the same optical fibre 54, but in different directions. There is further provided two optical circulators 56 which pass the combined light signals to the respective orthogonal mode splitters 52.

This embodiment has the advantage that the backplane 46 may comprise only passive components.

Figure 12:
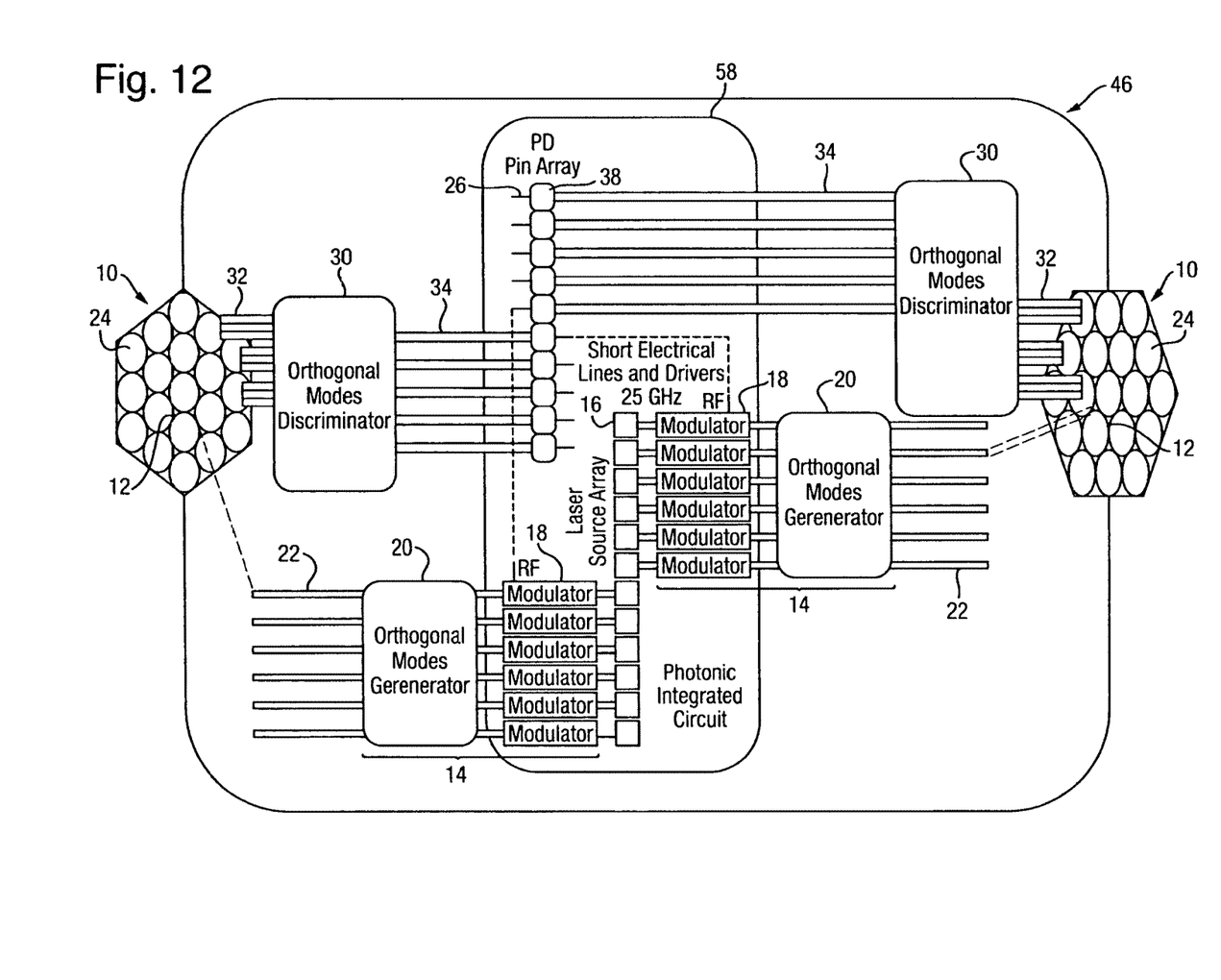
FIG. 12 illustrates an example of an active optical backplane according to an embodiment of the present invention.

FIG. 12 illustrates an optical backplane according to a second embodiment of the present invention. In this example, the backplane 46 again comprises an FSO receiver terminal 10 and an FSO transmitter terminal 10. However, in this example, these FSO terminals 10 are FSO terminals 10 as described above, with reference to FIG. 3 or 4 and FIG. 2 respectively. In this example, the plurality of optical-to-electrical signal convertors 26 and the light signal generating unit 14 are located on a photonic integrated circuit 58. In this example, as illustrated by the dotted lines, the light signal generating unit 14 is driven by at least one of the electrical signals output by the plurality of optical-to-electrical signal convertors 26. Thus, the light signals generated by the light signal generating unit 14 are modulated with the same information as that carried by the light signals received by the FSO receiver terminal 10.

Thus, advantageously, even if only one light signal is received by the FSO receiver terminal 10, a plurality of light signals, carrying the same information, can be transmitted through the FSO transmitter terminal 10. Thus, the tolerance to misalignment between the FSO terminals 10 on the backplane and those on the telecommunication cards (not shown), can be greater than that provided by the passive arrangement described above.

The telecommunications cards and, where an optical backplane is provided, the optical backplane may be comprised within a router or an optical node (not shown).

The invention claimed is:

1. A free space optical (FSO) communications terminal for a telecommunications card or a backplane, comprising:
   a plurality of transmission interfaces; and
   one or more lasers adapted to generate a plurality of light signals, each of the plurality of light signals carrying the same information as other one or more of the plurality of light signals and being arranged for transmission through a respective one of the plurality of transmission interfaces,
   wherein each of the plurality of light signals is at a different orthogonal mode from the other one or more of the plurality of light signals;
   wherein the one or more lasers are configured to:
     receive an indication identifying whether one or more of the different orthogonal modes were received by a second free space optical communications terminal for a telecommunications card or a backplane; and
     selectively turn off or adjust a power of each of the plurality of light signals based the received indication;
     wherein if the indication does not identify a respective orthogonal mode of a respective light signal as received by the second free space optical communications terminal or the backplane, the respective light signal is turned off or adjusted to have a reduced power and if the indication does identify the respective orthogonal mode of the respective light signal as received by the second free space optical communications terminal or the backplane, the respective light signal is maintained on or adjusted to have an increased power.

2. A telecommunications card comprising one or more FSO terminals as claimed in claim 1 and further comprising a free space optical (FSO) communications terminal for a second telecommunications card or a backplane, comprising:
   a plurality of receive interfaces, each of the plurality of receive interfaces adapted to receive a light signal carrying information, wherein the light signal may be at any one of a plurality of orthogonal modes; and
   a plurality of optical-to-electrical signal convertors.

3. A free space optical (FSO) communications terminal for a telecommunications card or a backplane, comprising:
   a plurality of receive interfaces, each of the plurality of receive interfaces adapted to receive a light signal carrying information, wherein the light signal may be at any one of a plurality of orthogonal modes; and
   a plurality of optical-to-electrical signal converters;
   a plurality of optical power detectors, each adapted to detect a power of a light signal received by a respective one of the plurality of optical-to-electrical signal converters, and
   a selector adapted to selectively pass an electrical signal output by a selected one of the plurality of optical-to-electrical signal converters to an information recovery unit; and
wherein:
   the selected one of the plurality of optical-to-electrical signal converters is selected based on the power of the light signal received by that optical-to-electrical signal convertor;
   the FSO terminal further comprises one or more processors adapted to form an indication identifying one or more of the plurality of orthogonal modes; and
   if the indication does not identify a respective orthogonal mode of a respective light signal, the respective light signal is turned off or adjusted to have a reduced power and if the indication does identify the respective orthogonal mode of the respective light signal, the respective light signal is maintained on or adjusted to have an increased power.

4. The FSO terminal according to claim 3, wherein each of the plurality of optical-to-electrical signal convertors is optically coupled to a respective one of the plurality of receive interfaces.

5. The FSO terminal according to claim 3, further comprising an orthogonal mode splitter;
   wherein the orthogonal mode splitter is optically coupled to each of the receive interfaces and is adapted to pass received light signals at respective orthogonal modes to respective ones of the plurality of optical-to-electrical signal convertors.

6. The FSO terminal according to claim 3 wherein each of the plurality of receive interfaces is circular and the plurality of receive interfaces are arranged according to circle packing.

7. A backplane comprising:
   a first FSO communications terminal according to claim 3; and
   one or more lasers adapted to generate a plurality of light signals using an electrical signal output by one of the electrical-to-optical signal convertors.

8. A backplane comprising:
   a first free space optical (FSO) communications terminal comprising a plurality of receive interfaces, each adapted to receive a light signal carrying information, wherein the light signal may be at any one of a plurality of orthogonal modes;
   a second free space optical (FSO) communications terminal comprising a plurality of transmission interfaces; and
   an optical fibre arrangement adapted such that each light signal received by the first FSO terminal is conveyed to the second FSO terminal such that received light signals at respective orthogonal modes are transmitted through respective ones of the plurality of transmission interfaces;
wherein the first FSO communications terminal further comprises:
   a plurality of optical power detectors, each adapted to detect a power of a light signal received by a respective one of the plurality of optical-to-electrical signal convertors, and
   a sector adapted to selectively pass an electrical signal output by a selected one of the plurality of optical-to-electrical signal convertors to an information recovery unit; and
wherein:
   the selected one of the plurality of optical-to-electrical signal convertors is selected based on the power of the light signal received by that optical-to-electrical signal convertor;
   the FSO terminal further comprises one or more processors adapted to form an indication identifying one or more of the plurality of orthogonal modes; and
   if the indication does not identify a respective orthogonal mode of a respective light signal, the respective light signal is turned off or adjusted to have a reduced power and if the indication does identify the respective orthogonal mode of the respective light signal, the respective light signal is maintained on or adjusted to have am increased power.

9. The backplane according to claim 8, wherein the optical fibre arrangement comprises an orthogonal mode multiplexer adapted to multiplex each of the light signals received by the first FSO terminal into a combined light signal; and
   an orthogonal mode de-multiplexer adapted to de-multiplex the combined light signal into a plurality of light signals, each at a respective orthogonal mode, for transmission through a respective one of the plurality of transmission interfaces.

* * * * *